United States Patent [19]
Smith, Jr. et al.

[11] Patent Number: 6,015,875
[45] Date of Patent: Jan. 18, 2000

[54] PROCESS FOR MAKING ACETALS

[75] Inventors: Lawrence A. Smith, Jr., Pasadena; Robert P. Arganbright, Seabrook, both of Tex.

[73] Assignee: Catalytic Distillation Technologies, Pasadena, Tex.

[21] Appl. No.: 09/132,174

[22] Filed: Aug. 11, 1998

[51] Int. Cl.[7] .................................. C08F 6/10; C08G 4/00
[52] U.S. Cl. ........................... 528/501; 528/23; 528/493; 528/502 R; 203/14; 203/62; 203/63; 203/78; 203/82; 203/84; 203/75
[58] Field of Search .............................. 528/23, 501, 493, 528/502 R, 503; 203/75, 78, 82, 84, 14, 62, 63

[56] References Cited

U.S. PATENT DOCUMENTS

| | | |
|---|---|---|
| 4,385,965 | 5/1983 | Muller et al. . |
| 4,967,014 | 10/1990 | Masamoto et al. . |
| 5,051,153 | 9/1991 | Berg . |
| 5,223,102 | 6/1993 | Feddkiw, Jr. et al. . |

*Primary Examiner*—Duc Truong
*Attorney, Agent, or Firm*—Kenneth H. Johnson

[57] ABSTRACT

Acetals are produced from the reaction of aldehydes and alcohols, e.g. methylal by the reaction of methanol and formaldehyde, by the reaction in a reaction distillation column of the alcohol and aldehyde in the presence of a catalyst and the concurrent fractional distillation of the reaction mixture to separate the reaction products, water and acetal.

19 Claims, 1 Drawing Sheet

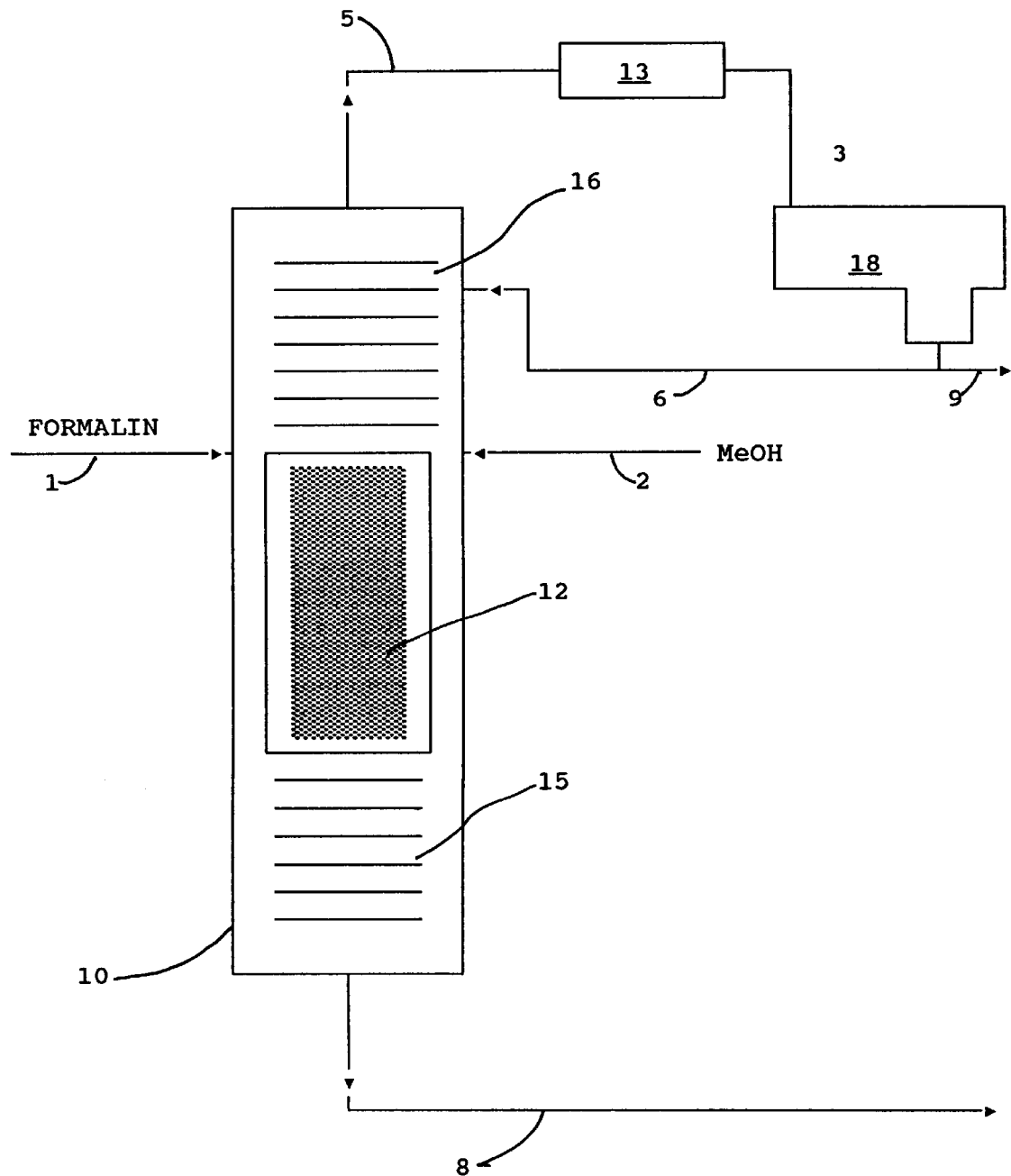

PROCESS FOR MAKING ACETALS

BACKGROUND OF THE INVENTION

1. Field of the Invention

The present invention relates to a process for the production of acetals from the reaction of a linear alkyl alcohol with an aldehyde. More particularly the invention relates to a process wherein the reaction is carried out simultaneously with the separation of the reaction products (water and methylal) from the reactants.

2. Related Art

It is known that acetals may be synthesized from alcohols and aldehydes in the presence of an acidic catalyst through a condensation reaction as illustrated by the following equations;

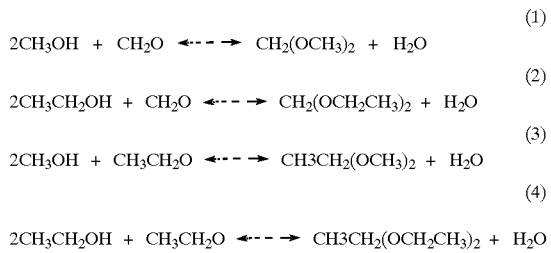

The IUPAC names for each of the reaction products is as follows:

(1) methanol+formaldehyde yields dimethyl acetal formaldehyde; common name methylal or dimethoxy methane (2) ethanol+formaldehyde yields diethyl acetal formaldehyde; common name ethylal or diethoxy ethane (3) methanol+acetaldehyde yields dimethyl acetal acetaldehyde; common name 1,1 dimethoxy ethane (4) ethanol+acetaldehyde yields diethyl acetal acetaldehyde; common name 1,1 diethoxy ethane or acetal.

While "acetal" is one of the common names of diethyl acetal acetaldehyde, the term acetal as used herein means the reaction product of an alcohol with an aldehyde.

Acetals are considerably more stable to alkalies than to acids. They are considered so much more stable than free aldehydes to the action of basic reagents and oxidizing agents that aldehydic compounds are often converted into the acetals to protect the aldehydic function from damage during the course of synthesis operations involving other parts of the molecule.

Methylal is useful in the production of high concentration formaldehyde as disclosed in U.S. Pat. No. 4,967,014. Therein a two step process for the production of highly concentrated formaldehyde is disclosed wherein the first step is to react methanol with lower concentrations of formaldehyde to form methylal and the subsequent oxidation of the methylal to formaldehyde. Methylal is also useful for extracting certain sulfonated organic compounds from the alcohols used to prepare such compounds as disclosed in U.S. Pat. No. 4,096,175.

U.S. Pat. No. 4,385,965 discloses a process for the recovery of pure methylal from methanol-methylal mixtures. U.S. Pat. No. 5,223,102 discloses a process for the electrooxidation of methanol to formaldehyde and methylal.

SUMMARY OF THE INVENTION

Briefly, the present invention is a process for the production of acetals by contacting an alcohol and an aldehyde in a distillation column reactor containing an acidic catalyst in a distillation reaction zone thereby catalytically reacting said alcohol and aldehyde to produce acetal product and water and concurrently in said distillation reaction zone and fractionating the acetal product from said water and unreacted materials. The catalyst may be in the form of a catalytic distillation structure which provides both the catalytic sites and the distillation sites. The acetal product is withdrawn from the distillation column reactor as overheads and the water is removed as bottoms. The distillation column reactor is operated to keep the alcohol and aldehyde within the distillation reaction zone.

The term "reactive distillation" is sometimes also used to describe the concurrent reaction and fractionation in a column. For the purposes of the present invention, the term "catalytic distillation" includes reactive distillation and any other process of concurrent reaction and fractional distillation in a column regardless of the designation applied thereto.

More specifically the acidic catalyst is of such a nature as to allow vapor flow through the bed, yet provide a sufficient surface area for catalytic contact. The catalyst packing is preferably arranged in the middle portion of the distillation column reactor, more preferably occupying about one-third to one half of the column.

BRIEF DESCRIPTION OF THE DRAWING

The drawing is a schematic representation of one embodiment of one species of the present invention wherein a catalytic distillation structure bed is disposed in a column with methanol and formaldehyde fed to the column and product methylal remove as overheads.

DETAILED DESCRIPTION OF THE INVENTION

Suitable acidic catalysts are acidic cation exchange resins or molecular sieves, of particular interest are the Y and beta zeolites. Generally the molecular sieves and cation exchange resins are in much too fine a form to use as distillation packing since there is a very large pressure drop through the bed and the free flow of internal reflux and rising vapor is impeded. However, catalysts in the shape of conventional distillation structures, such as rings, saddles, and the like may be used in the present invention.

The catalytic material is preferably a component of a distillation system functioning as both a catalyst and distillation packing, i.e., a packing for a distillation column having both a distillation function and a catalytic function, however, the present integrated refinery may also use such systems as described in U.S. Pat. Nos. 5,133,942; 5,368,691; 5,308,592; 5,523,061; and European Patent Application No. EP 0 755 706 A1.

The reaction system can be described as heterogenous since the catalyst remains a distinct entity. A preferred catalyst structure for the present reaction comprises flexible, semi-rigid open mesh tubular material, such as stainless steel wire mesh, filled with a particulate catalytic material in one of several embodiments recently developed in conjunction with the present process.

Of particular interest is the structured packing disclosed and claimed in U.S. Pat. No. 5,730,843 which is incorporated herein in its entirety. Other catalyst structures useful in the present refinery scheme are described in U.S. Pat. Nos. 5,266,546; 4,242,530; 4,443,559; 5,348,710; 4,731,229 and 5,073,236 which are also incorporated by reference.

The particulate catalyst material may be a powder, small irregular chunks or fragments, small beads and the like. The particular form of the catalytic material in the structure is not critical so long as sufficient surface area is provided to allow a reasonable reaction rate. The sizing of catalyst particles can be best determined for each catalytic material (since the porosity or available internal surface area will vary for different material and, of course, affect the activity of the catalytic material).

The particular reactions and products of interest are formaldehyde and acetaldehyde reactions with $C_1$–$C_3$ alcohols to produce the corresponding acetal. The products are thus dimethyl acetal formaldehyde (methylal or dimethoxy methane), diethyl acetal formaldehyde (ethylal or diethoxy ethane), dimethyl acetal acetaldehyde (1,1 dimethoxy ethane), diethyl acetal acetaldehyde (1,1 diethoxy ethane) and dipropyl acetal formaldehyde (dipropoxymethane).

The reactants are preferably linear alcohols and linear aldehydes, more preferably having one or two carbon atoms. The alcohol and aldehyde may be fed to the distillation column reactor above the catalyst section. The success of catalytic distillation lies in an understanding of the principles associated with distillation. First, because the reaction is occurring concurrently with distillation, the initial reaction product is removed from the reaction zone as quickly as it is formed. Second, because the reaction mixture is boiling, the temperature of the reaction is controlled by the boiling point of the mixture at the system pressure. The heat of the reaction simply creates more boil up but no increase in temperature. Third, the reaction has an increased driving force because the reaction products have been removed and cannot contribute to a reverse reaction (Le Chatelier's Principle).

As a result, a great deal of control over the rate of reaction and distribution of products can be achieved by regulating the system pressure. Also, adjusting the through-put gives further control of product distribution and degree of olefin conversion. The temperature in the reactor is determined by the boiling point of the liquid mixture present at any given pressure. The temperature in the lower portions of the column will reflect the constitution of the material in that part of the column which will be higher than the overhead; that is, at constant pressure a change in the temperature of the system indicates a change in the composition in the column. To change the temperature the pressure is changed. Temperature control in the reaction zone is thus controlled by the pressure; by increasing the pressure, the temperature in the system is increased and vice versa. It can also be appreciated that in catalytic distillation as in any distillation there is both a liquid phase (internal reflux) and a vapor phase. Thus, the reactants are partially in liquid phase which allows for a more dense concentration of molecules for reaction, whereas, the concurrent fractionation separates product and unreacted materials, providing the benefits of a liquid phase system (and a vapor phase system) while avoiding the detriment of having all of the components of the reaction system continually in contact with the catalyst which would limit the conversion to the equilibrium of the reaction system components.

Referring now to the figure a simplified flow diagram of the process is shown. The distillation column reactor 10 is shown to have a distillation reaction zone 12 containing the catalytic distillation structure, a stripping section 15 and a rectification section 16. The stripping section 15 and rectification section 16 both contain standard distillation structures such as inert packing, bubble cap trays or sieve trays.

An aqueous solution of aldehyde is fed to the distillation column via flow line 1 and alcohol is fed via flow line 2. The alcohol reacts with the aldehyde in the aqueous solution to form acetal and water. The acetal product is removed as overheads via flow line 5 and condensed in condenser 13 and carried on to receiver 18 via flow line 3. Product methylal is removed by flow line 9 and a portion of the overheads is returned to the distillation column reactor 10 as reflux via flow line 6. Water is removed as bottoms via flow line 8. In some cases wherein the acetal product is higher boiling than water (1,1 diethoxy ethane b.p.=102.2° C.) the product is primarily removed as overheads due to azeotroping with the alcohol and water.

The distillation column reactor is preferably operated such that the aldehyde and alcohol are maintained within the distillation reaction zone for substantially complete reaction. If necessary a molar excess of alcohol may be supplied with unreacted alcohol being removed as overheads with the acetal product. If such is the case then a separate distillation column for separation of the alcohol from the acetal product would be required.

EXAMPLE

A one inch diameter distillation column is loaded with 2 feet of LZY 82 molecular sieve catalyst prepared as a distillation structure as described above and supported in the column by 2 feet of standard inert packing. The LZY 82 is an ultra stable Y zeolite. In addition 2 feet of ¼" saddles are loaded on top of the catalyst. Methanol and formalin (a 40% aqueous solution of formaldehyde) feed are started to the column and the pressure increased until the desired temperature is reached. After four hours the temperature in the bed is 252° F. with an overhead pressure of 100 psig. The overheads contains 77% methylal and 22% methanol as measured by gas chromatography. After another two hours the temperature in the bed was between 250° F and 300° F. with an overhead pressure of 95 psig. At this point the overheads contains 73.5% methylal and 26.5% methanol.

The collected overheads is further distilled in a 2" Oldershaw column to concentrate the product. The resultant overheads contains 0.2% dimethyl ether, 3.5% methanol, 0.8% unknown and 95.5% methylal.

The activity of the LZY 82 molecular sieve was unexpectedly high in the presence of the water. Normally one would expect the water in the formalin and water product to dilute the acidity of the molecular sieve and reduce the activity.

The invention claimed is:

1. A process for the production of acetals from the reaction of aldehydes and alcohol comprising:
   (a) feeding a first stream containing a linear alcohol to a distillation column reactor;
   (b) feeding a second stream containing an aldehyde to the distillation column reactor;
   (c) concurrently in said distillation column reactor
      (i) contacting the aldehyde and alcohol in the presence of an acidic catalyst in a distillation reaction zone to react a portion of the aldehyde with a portion of the alcohol to form a reaction mixture containing acetal, water and unreacted alcohol and unreacted aldehyde,
      (ii) operating said distillation column reactor to maintain the alcohol and aldehyde within said distillation reaction zone, and
      (iii) separating the acetal product from the reaction mixture; and
   (d) withdrawing the separated acetal from the distillation column reactor at a point above said distillation reaction zone.

2. The process according to claim 1 wherein the aldehyde is selected from the group consisting of formaldehyde and acetaldehyde and the alcohol is selected from the group consisting of methanol, ethanol and propanol.

3. The process according to claim 1 wherein said second stream comprises an aqueous solution of the aldehyde.

4. The process according to claim 1 wherein said acidic catalyst comprises an ultra stable Y molecular sieve.

5. The process according to claim 1 wherein said acidic catalyst comprises beta molecular sieve.

6. The process according to claim 1 wherein the temperature within said distillation reaction zone is between 200 and 400° F.

7. The process according to claim 1 wherein the overhead pressure is controlled between 70 and 170 psig.

8. The process according to claim 1 wherein water is withdrawn from said distillation column reactor at a point below said distillation reaction zone.

9. The process according to claim 1 wherein there is a molar excess of alcohol fed to said distillation column reactor and a portion of the unreacted alcohol is withdrawn along with said acetal.

10. The process according to claim 1 wherein said alcohol comprises methanol.

11. The process according to claim 10 wherein said aldehyde comprises formaldehyde.

12. The process according to claim 10 wherein said aldehyde comprises acetaldehyde.

13. The process according to claim 1 wherein said alcohol comprises ethanol.

14. The process according to claim 13 wherein said aldehyde comprises formaldehyde.

15. The process according to claim 13 wherein said aldehyde comprises acetaldehyde.

16. A process for the production of methylal from the reaction of formaldehyde and methanol comprising:
   (a) feeding a first stream containing methanol to a distillation column reactor;
   (b) feeding a second stream comprising formalin to the distillation column reactor;
   (c) concurrently in said distillation column reactor
      (i) contacting the formaldehyde in said formalin and methanol in the presence of an acidic catalyst in a distillation reaction zone to react a portion of the formaldehyde with a portion of the methanol to form a reaction mixture containing methylal, water and unreacted methanol and unreacted formaldehyde, and
      (ii) operating the distillation column reactor to maintain the formaldehyde and methanol in said distillation reaction zone;
      (iii) separating the methylal and water products from the reaction mixture;
   (d) withdrawing the separated methylal from the distillation column reactor at a point above said distillation reaction zone; and
   (e) withdrawing the separated water from the distillation column reactor at a point below said distillation reaction zone.

17. The process according to claim 16 wherein said acidic catalyst comprises ultra stable Y molecular sieve.

18. The process according to claim 16 wherein the temperature within said distillation reaction zone is between 200 and 400° F.

19. The process according to claim 16 wherein the overhead pressure is controlled between 70 and 170 psig.

* * * * *